(12) United States Patent     (10) Patent No.: US 7,738,746 B2
Charters et al.     (45) Date of Patent: Jun. 15, 2010

(54) OPTICAL ELEMENTS FOR WAVEGUIDE-BASED OPTICAL TOUCH SCREENS

(75) Inventors: Robbie Charters, Palmerston (AU); Ian Andrew Maxwell, New South Wales (AU); Benjamin Cornish, Acton (AU); Warwick Todd Holloway, Kambah (AU)

(73) Assignee: RPO Pty Limited, Acton (AU)

( * ) Notice: Subject to any disclaimer, the term of this patent is extended or adjusted under 35 U.S.C. 154(b) by 58 days.

(21) Appl. No.: 11/552,380

(22) Filed: Oct. 24, 2006

(65) Prior Publication Data

US 2007/0253717 A1     Nov. 1, 2007

Related U.S. Application Data

(60) Provisional application No. 60/729,628, filed on Oct. 24, 2005.

(51) Int. Cl.
    *G02B 6/00*     (2006.01)
    *G06F 3/042*     (2006.01)
    *G02B 6/10*     (2006.01)

(52) U.S. Cl. .................. 385/13; 385/129; 345/173; 345/175

(58) Field of Classification Search .................. 345/173, 345/175, 176; 385/12, 13, 129, 37
See application file for complete search history.

(56) References Cited

U.S. PATENT DOCUMENTS

| | | | |
|---|---|---|---|
| 3,478,220 A | 11/1969 | Milroy | |
| 3,673,327 A | 6/1972 | Johnson at al. | |
| 3,764,813 A | 10/1973 | Clement et al. | |
| 3,775,560 A | 11/1973 | Ebeling et al. | |
| 4,737,633 A | 4/1988 | Sasaki et al. | |
| 4,988,983 A | 1/1991 | Wehrer | |
| 5,179,369 A | 1/1993 | Person et al. | |
| 5,321,779 A * | 6/1994 | Kissa | 385/14 |
| 5,748,825 A * | 5/1998 | Rockwell, III | 385/126 |
| 5,811,312 A * | 9/1998 | Hasegawa et al. | 436/527 |
| 5,914,709 A | 6/1999 | Graham et al. | |

(Continued)

FOREIGN PATENT DOCUMENTS

EP     0883000 A1     12/1998

OTHER PUBLICATIONS

WA McDonald, Engineered films for display technologies, Journal of Materials Chemistry, vol. 14, pp. 4-10, (2004).

(Continued)

*Primary Examiner*—Uyen-Chau N Le
*Assistant Examiner*—Rhonda S Peace
(74) *Attorney, Agent, or Firm*—Miller, Matthias & Hull (57) ABSTRACT

A data input apparatus having at least one transmit element coupled to a source of light of a predetermined wavelength, at least one light receive element and a detection device to detect interruption of beams of the light of said predetermined wavelength extending from said transmit element to said receive element wherein at least one of said transmit element and said receive element comprises at least one waveguide having a light transmitting core and a non-core portion and one or more discontinuance means adapted to reduce transmission of stray light within the non-core portion. The discontinuance is adapted to scatter, absorb, divert or block stray light and can be applied to one or more of the upper cladding, lower cladding, substrate or common base.

58 Claims, 9 Drawing Sheets

U.S. PATENT DOCUMENTS

| | | | |
|---|---|---|---|
| 6,181,842 B1 | 1/2001 | Francis et al. | |
| 6,351,260 B1 | 2/2002 | Graham et al. | |
| 6,351,575 B1* | 2/2002 | Gampp et al. | 385/14 |
| 6,418,246 B1* | 7/2002 | Gampp | 385/14 |
| 6,800,724 B2 | 10/2004 | Zha et al. | |
| 6,818,721 B2 | 11/2004 | Zha et al. | |
| 6,920,257 B1 | 7/2005 | Mekis et al. | |
| 7,280,102 B2* | 10/2007 | Abileah et al. | 345/204 |
| 7,351,949 B2* | 4/2008 | Oon et al. | 250/221 |
| 2002/0088930 A1 | 7/2002 | Graham et al. | |
| 2002/0109097 A1* | 8/2002 | Tashiro | 250/370.09 |
| 2004/0080267 A1* | 4/2004 | Cok | 313/512 |
| 2004/0201579 A1* | 10/2004 | Graham | 345/175 |
| 2005/0128190 A1* | 6/2005 | Ryynanen | 345/173 |
| 2006/0013532 A1* | 1/2006 | Wan | 385/31 |
| 2006/0267953 A1* | 11/2006 | Peterson et al. | 345/173 |

OTHER PUBLICATIONS

M J F. Digonnet et al , Measurement of the Core Proximity in Polished Fiber Substrates and Couplers, Optics Letters, vol. 10, No. 9, pp. 463-365, (Sep. 1985).

* cited by examiner

OPTICAL ELEMENTS FOR WAVEGUIDE-BASED OPTICAL TOUCH SCREENS

CROSS-REFERENCE TO RELATED APPLICATION

This is a non-provisional patent application claiming the priority benefits under 35 USC 119(e) of U.S. provisional patent application Ser. No. 60/729,620, filed on Oct. 24, 2005.

FIELD OF THE DISCLOSURE

This disclosure relates to improved designs for the transmit and receive waveguides of a waveguide-based optical touch screen sensor. In a preferred form, they provide a superior signal-to-noise ratio and are less susceptible to stray light.

BACKGROUND TO THE DISCLOSURE

Any discussion of the prior art throughout the specification should in no way be considered as an admission that such prior art is widely known or forms part of common general knowledge in the field.

Touch screen input devices or sensors for computers and other consumer electronics devices such as mobile phones, personal digital assistants (PDAs) and hand-held games are highly desirable due to their extreme ease of use. In the past, a variety of approaches have been used to provide touch screen input devices. The most common approach uses a flexible resistive overlay, although the overlay is easily damaged, can cause glare problems, and tends to dim the underlying screen, requiring excess power usage to compensate for such dimming. Resistive devices can also be sensitive to humidity, and the cost and drive power consumption of the resistive overlay scale quadratically with perimeter. Another approach is the capacitive touch screen, which also requires an overlay. In this case the overlay is generally more durable, but the glare and dimming problems remain.

In yet another common approach, a matrix of light beams (usually infrared) is established in front of a display with a touch event detected by the interruption of one or more of the beams. Such "optical" touch screens have long been known (U.S. Pat. Nos. 3,478,220; 3,673,327), with the beams generated by arrays of optical sources such as light emitting diodes (LEDs) or vertical cavity surface emitting lasers (VCSELs) and detected by corresponding arrays of detectors (such as phototransistors or photodiodes). This type of optical touch screen has the advantage of being overlay-free and can function in a variety of ambient light conditions (U.S. Pat. No. 4,988,983), but has a major cost problem in that it requires a large number of source and detector components, as well as supporting electronics. Since the spatial resolution of such a system depends on the number of sources and detectors, this component cost increases with resolution.

U.S. Pat. Nos. 5,914,709, 6,181,842 and 6,351,260, and U.S. Patent Application Nos. 2002/0088930 A1 and 2004/0201579 A1, each of which is incorporated herein by reference in its entirety, disclose an improved type of optical touch screen sensor, where waveguides are used to distribute and collect the matrix of light beams. As discussed below with reference to FIG. 1, this approach requires only a single optical source and a single multi-element detector representing a substantial cost reduction.

Figure 1:
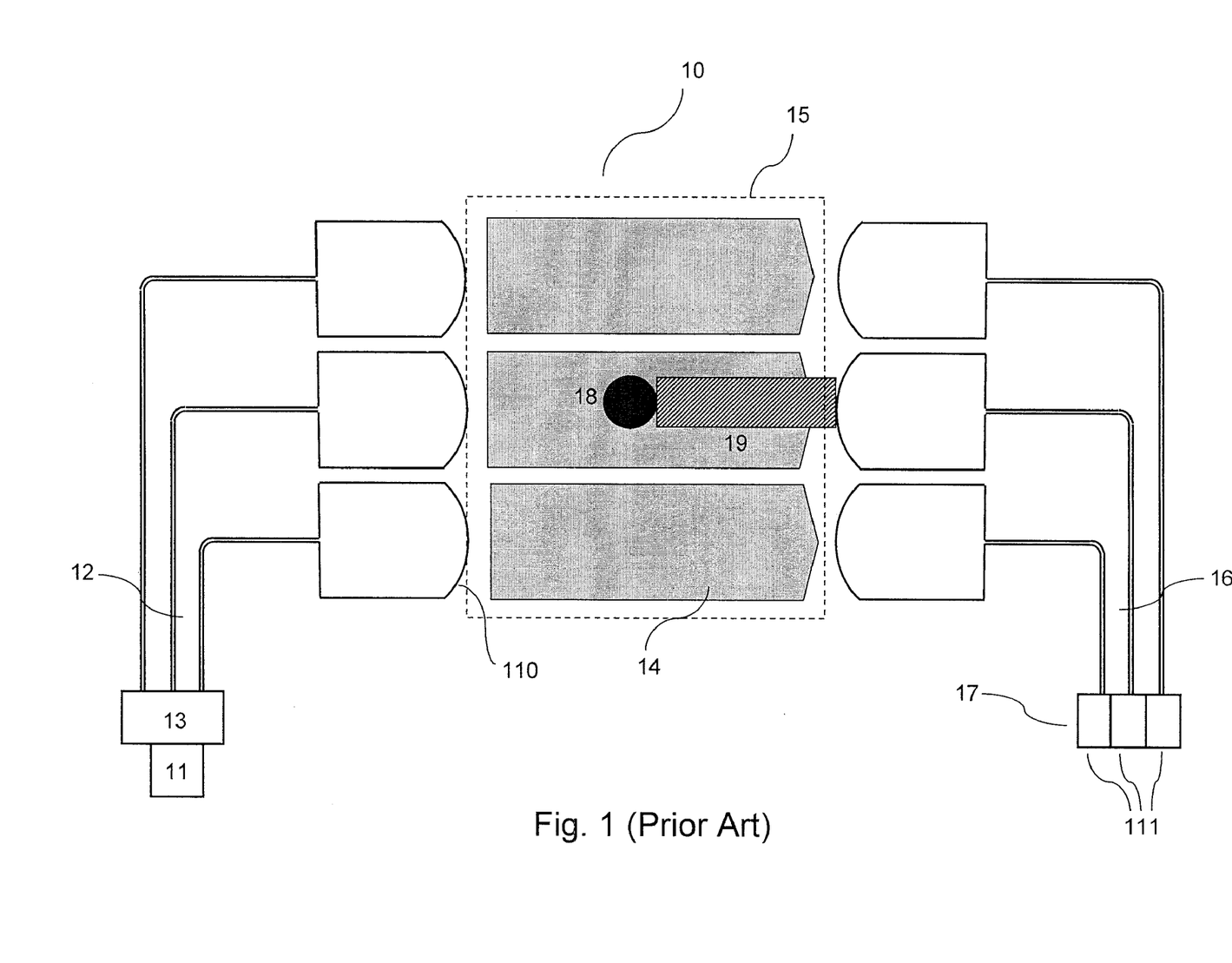
FIG. 1 illustrates the operation of a waveguide-based optical touch screen sensor incorporating lenses to provide in-plane focusing of the light beams.

FIG. 1 illustrates the operation of an optical touch screen sensor 10 similar to that described in U.S. Pat. Nos. 5,914,709, 6,181,842 and 6,351,260, and U.S. patent application Ser. Nos. 2002/0088930 A1 and 2004/0201579 A1. In this optical touch screen sensor design a single optical source 11 (such as an LED or a VCSEL) launches light into an array of "transmit" integrated optical waveguides 12, via some form of 1.times.N splitter 13. Optical waveguides 12 then launch an array of parallel, spaced apart light beams 14 across a display area 15, which are then collected at the other side of the display area by a similar array of "receive" integrated optical waveguides 16 and conducted to a position-sensitive (i.e. multi-element) detector 17. A touch event 18 (e.g. by a finger or stylus) is detected as a shadow 19, with position determined from the particular beam(s) blocked by the touching object.

The touch screen sensors are usually two dimensional and rectangular, with two arrays (X, Y) of transmit waveguides along adjacent sides of the display area, and two corresponding arrays of receive waveguides along the other two sides of the display area. In one construction, a single optical source launches light into a plurality of waveguides that form both the X and Y transmit arrays. In another version, separate optical sources are used for each of the X and Y transmit arrays. On the transmit side, the waveguide arrays may guide light from the optical source to rows of lens elements 110 that expand the guided light beams in the horizontal (i.e. X, Y) plane, then collimate them in the horizontal plane as they are launched across the display area. Collimation in the vertical plane may be achieved with an external vertical collimating lens (VCL), for example a cylindrical lens (not shown in FIG. 1). The receive side is essentially identical, and on each side the arrays of waveguides and lens elements are positioned within and protected by the bezel of the screen. To minimize the width of the bezel, it is desirable for the transmit and receive elements to be as short as possible.

As is usual with integrated optical waveguides, "transmit" optical waveguides 12 and "receive" optical waveguides 16 each consist of an array of patterned, light guiding cores (of refractive index $n_1$) surrounded by a cladding (of refractive index $n_2$, where $n_2 < n_1$) and mounted on a mechanically robust substrate. Frequently, the portion of cladding between the light guiding cores and the substrate is referred to as the "lower cladding" or "bottom cladding", with the remainder of the cladding referred to as the "upper cladding" or "top cladding".

In the type of optical touch screen sensor described above, each "receive" waveguide 16 is in optical communication with an integral number (usually one, but possibly more) of individual elements 111 of multi-element detector 17. It will be appreciated that for this system to accurately determine the position of a touch event, it is crucial that the light in each of the spaced apart beams 14 be faithfully guided by receive waveguides 16 to the respective elements 111 of multi-element detector 17. If the individual elements 111 of multi-element detector 17 receive light from any source other than the appropriate receive waveguides 16, the performance of the touch screen sensor, as measured for example by the signal-to-noise ratio at the detector, will be degraded. One possible source of stray light is ambient light captured by the transmit- or receive-side lenses. Another possible source of stray light is signal light in spaced apart beams 14 that gets captured by the substrate or cladding of receive waveguides 16, instead of by the waveguide cores.

The present disclosure ameliorates or at least provides a commercial alternative to the prior art and that, at least in the preferred embodiments improves performance of optical touch screen sensors.

SUMMARY OF THE DISCLOSURE

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

In a first aspect, the present disclosure provides a data input apparatus having at least one transmit element, at least one light receive element and a detection device to detect interruption of beams of light extending from said transmit element to said receive element, wherein at least one of said transmit element and said receive element comprises at least one waveguide, each waveguide having a light transmitting core for transmission of light of a predetermined wavelength and a non-core portion comprising at least one of an upper cladding, a lower cladding and a substrate, and one or more discontinuance means adapted to reduce transmission of stray light within the non-core portion.

In a second aspect, the present disclosure provides a method for reducing the transmission of stray light in a data input apparatus, said data input apparatus comprising at least one transmit element, at least one receive element and a detection device to detect interruption of beams of light extending from said transmit element to said receive element, wherein at least one of said transmit element and said receive element comprises at least one waveguide, each waveguide having a light transmitting core for transmission of light of a predetermined wavelength and a non-core portion comprising at least one of an upper cladding, a lower cladding and a substrate, and wherein said method comprises providing said non-core portion with one or more discontinuance means adapted to reduce transmission of stray light within the non-core portion.

Preferably, said beams of light are passed across an input area, said transmit and receive elements being positioned on opposite sides of said input area.

Preferably, said input area is quadrilateral, with a first set of said transmit and receive elements arranged along first and third sides of the input area, and a second set of said transmit and receive elements arranged along second and fourth sides of the input area. More preferably, said input area is rectangular, with the direction of light beams from said first set being substantially perpendicular to the direction of light beams from said second set. Preferably, said first and said second transmit elements are contiguous, and said first and said second receive elements are contiguous.

Preferably, a user provides input to the data input apparatus by interacting with the input area. More preferably, the user interacts with the input area with a finger or stylus.

Preferably, the non-core portion includes one or more of an upper cladding, a lower cladding and a substrate.

The discontinuance may be adapted to absorb or scatter stray light.

In one embodiment the discontinuance comprises a means to divert stray light, wherein the discontinuance comprises a plurality of light scattering grooves cut into the substrate.

Alternatively or additionally, the discontinuance comprises a light absorbing coating applied to one or more of the cladding or substrate.

For the purposes of this disclosure, the terms "predetermined wavelength" and "operating wavelength" refer to the wavelength of light emitted by optical source 11 and transmitted by waveguides 12 and 16, and the term "signal light" refers to light emitted by optical source 11. It will be understood by those skilled in the art that optical sources generally emit light with a range of wavelengths rather than at a single wavelength; this wavelength range may be relatively narrow if the optical source is a laser such as a VCSEL, or relatively broad if it is a non-lasing source such as an LED. The "predetermined wavelength" is typically in the near infrared (say 700 nm to 1000 nm) because of the availability of inexpensive sources and detectors, and so that the signal light does not interfere with a user's perception of the display. However the predetermined wavelength may also be in the visible or any other suitable spectral region. This specification is written assuming a predetermined wavelength of approximately 850 nm, but it will be appreciated that the embodiments of the invention may be readily adapted for other predetermined wavelengths, including in the visible.

The term "ambient light" refers to light from any origin besides optical source 11, typically room lights or sunlight. Ambient light generally comprises a range of ultraviolet, visible and infrared wavelengths, typically including the predetermined wavelength, and is of concern in optical touch screen sensors because multi-element detector 17 typically comprises an array of silicon photodiodes or phototransistors, broadly sensitive to wavelengths below 1000 nm.

The term "stray light" refers to light of any wavelength that is trapped or guided in the cladding or substrate, i.e. the non-core portion, of "transmit" optical waveguides 12 or "receive" optical waveguides 16.

The term "highly absorbing" when applied to a material means the material has an optical absorption of at least 10 dB/cm, more preferably at least 20 dB/cm, and most preferably at least 30 dB/cm, for a given wavelength or range of wavelengths.

For reasons of cost and ease of fabrication, it is highly preferred to form the waveguides and lens elements out of a photo-patternable polymer material.

Preferably, light of said predetermined wavelength is absorbed by said discontinuance. Preferably, said discontinuance comprises a substance with broadband absorption in the UV, visible and infrared regions of the spectrum, whereby stray light is absorbed by said discontinuance. Alternatively, said discontinuance comprises a polymer doped with an organic dye that is highly absorbing at said predetermined wavelength. The polymer may additionally be doped with a substance with broadband absorption in the UV, visible and infrared regions of the spectrum, whereby stray light is absorbed by said discontinuance.

Alternatively, stray light is scattered by said discontinuance

In one embodiment, said discontinuance comprises material deposited along an edge of said waveguide, for instance along an edge of the substrate and/or cladding. Preferably, the refractive index of said material is substantially similar to the refractive index of the respective substrate or cladding.

In another preferred embodiment, said material is located over at least a portion of a surface of said substrate. Preferably such material has a refractive index slightly higher than that of the substrate. This assists in preferentially drawing any stray light guided within the substrate into said material. Preferably, said material is located on a surface of the substrate opposing the surface in contact with the cladding. Alternatively, said material is located between the substrate and the cladding.

Preferably, said waveguide is composed of a polymer material. The polymer material may be a thermally curable polymer. Alternatively, the polymer material may be a polymer curable by actinic radiation, preferably by UV radiation. Preferably, the polymer material is a siloxane polymer. Preferably, said waveguide structure is patterned by UV photolithography.

As discussed above, said waveguide preferably comprises a lower cladding layer, a patterned core layer and an upper cladding layer. Generally, said lower cladding layer is in contact with the respective substrate. Preferably, said lower cladding layer, patterned core layer and upper cladding layer are composed of UV curable polymers, and said patterned core layer is patterned by UV photolithography. Even more preferably, the UV curable polymers are siloxane polymers Preferably, said substrate is composed of glass or a polymeric material. More preferably, said substrate is composed of a polymer material selected from polyethylene terephthalate, polyethylene naphthalate, polycarbonate, polyvinyl chloride, polystyrene, an acrylate such as polymethyl methacrylate, and polyimide.

In another embodiment the discontinuance is provided by a common base onto which an external vertical collimating lens (VCL) and the respective transmit/receive elements are mounted. In such an embodiment the common base may comprise a material that is highly absorbing at the predetermined wavelength, or be coated with a material highly absorbing at the predetermined wavelength. Alternatively or in addition thereto the common base may include or be coated with a substance with broadband absorption in the UV, visible and near infrared regions of the spectrum. The common base may also be constructed from a material with a refractive index higher than that of the substrate to preferentially draw stray light into the common base. In yet another embodiment an external VCL and common base may form a unitary structure. In this particular embodiment, the common base may be coated with a material highly absorbing at the predetermined wavelength, but cannot include such a material since the VCL is in the optical path.

In yet another embodiment, the discontinuance comprises a plurality of light scattering grooves cut into the substrate or some other layer, such as a common base, not directly in the optical path. This embodiment may be combined with any of the previous embodiments.

The previous embodiments may also be combined with aperture or positioning means to restrict the direct entry of stray light into the substrate, or the direct transmission of stray light from the substrate to the multi-element detector.

BRIEF DESCRIPTION OF DRAWINGS

The disclosure will now be described, by way of example only, with reference to the accompanying drawings in which.

DETAILED DESCRIPTION OF THE DISCLOSURE

As described in the background section, U.S. Pat. Nos. 5,914,709, 6,181,842 and 6,351,260, and U.S. Patent Application Nos. 2002/0088930 A1 and 2004/0201579 A1 disclose an improved type of optical touch screen sensor requiring only a single optical source and a single multi-element detector, and using waveguides to distribute and collect the matrix of light beams.

To improve the commercial viability of optical touch screens of this type for use in consumer electronics devices, the various components should be fabricated and assembled at lowest cost. In particular, the waveguides and associated collimating optics must be able to be mass produced in a low cost manner, a requirement that can at present only be satisfied with polymer materials. Photo-patternable polymers that can be processed using a photolithography/wet development method are particularly preferred because of the ease and mild conditions (e.g. UV exposure followed by solvent development) by which they can be patterned, and the relatively low cost of the processing equipment.

Examples of photo-patternable polymers include acrylates and siloxanes. One particularly suitable class of materials is UV curable siloxane polymers, synthesised for example by a condensation reaction as disclosed in U.S. Pat. Nos. 6,800,724 and 6,818,721, each of which is incorporated herein by reference in its entirety. Siloxane polymers have excellent adhesion to a variety of substrate materials, including silicon, glass and plastics. A photoinitiator or thermal initiator may be added to increase the rate of curing. Examples of commercially available photoinitiators include 1-hydroxy-cyclohexyl-phenyl-ketone (Irgacure 184), 2-methyl-1[4-methylthio)phenyl]-2-morpholinopropan-1-one (Irgacure 907), 2,2-dimethoxy-1,2-diphenylethan-1-one (Irgacure 651), 2-benzyl-2-dimethylamino-1-(4-morpholinophenyl)-butanone-1 (Irgacure 369), 4-(dimethylamino)benzophenone, 2-hydroxy-2-methyl-1-phenyl-propan-1-one (Darocur 1173), benzophenone (Darocur BP), 1-[4-(2-hydroxyethoxy)-phenyl]-2-hydroxy-2-methyl-1-propane-1-one (Irgacure 2959), 4,4'-bis(diethylamino) benzophenone (DEAB), 2-chlorothioxanthone, 2-methylthioxanthone, 2-isopropylthioxanthone, benzoin and 4,4'-dimethoxybenzoin. For curing with visible light, the initiator may for example be camphorquinone. A mixture of two or more photoinitiators may also be used. For example, Irgacure 1000 is a mixture of 80% Darocur 1173 and 20% Irgacure 184. For thermal curing, organic peroxides in the form of peroxides (eg. dibenzoyl peroxide), peroxydicarbonates, peresters (t-butyl perbenzoate), perketals, hydroperoxides, as well as AIBN (azobisisobutyronitrile), may be used as initiators.

Other additives, such as stabilisers, plasticisers, contrast enhancers, dyes or fillers may be added to enhance the properties of the polymer as required.

In this specification, the optical waveguides and associated lenses will be exemplified as being fabricated from photo-patternable siloxane polymers using a photolithography/wet etch process. However it will be appreciated that the waveguides and lenses could be composed of any other material system known in the art for integrated optical waveguides, such as glass, and patterned by any other means known in the art, such as reactive ion etching.

In any "optical" touch screen sensor employing a matrix of light beams, the location of a touch event is determined from the particular beams that are blocked by the touching object. In a conventional type of optical touch screen sensor with paired arrays of sources and detectors, accurate detection of touch position is usually achieved by ensuring that each detector receives or is sensitive to light solely from its corresponding source, and to this end a number of strategies including sequential activation of the sources and/or detectors (U.S. Pat. Nos. 3,764,813, 3,775,560) and modulation of the sources (U.S. Pat. No. 5,179,369) have been proposed. However such strategies cannot be used in touch screen sensors with only a single optical source. In this case, as illustrated in FIG. 1, accurate determination of touch location can only be achieved if the light in each of the spaced apart beams 14 is faithfully guided via receive waveguides 16 to the respective elements 111 of multi-element detector 17. If the individual elements 111 of multi-element detector 17 receive "stray" light from any source other than the appropriate receive waveguides 16, the performance of the touch screen sensor will be degraded.

To illustrate the stray light problem in waveguide-based optical touch screen sensors, the construction of a "receive side" optical waveguide array will now be described with reference to FIG. 2a (plan view) and FIG. 2b (side view). A single element 20 of a receive side optical waveguide array, assembled with a vertical collimating lens (VCL) 21, is shown. Receive element 20 comprises a slab waveguide 22 with curved front surface 23, and an output waveguide 24 in optical communication with the respective element(s) of the multi-element detector. Slab waveguide 22 and output waveguide 24 generally comprise a lower cladding layer 25, patterned core layer 26 and upper cladding layer 27, each deposited in turn on substrate 28. Preferably, lower cladding layer 25, patterned core layer 26 and upper cladding layer 27 are all composed of photo-patternable polymers, but may comprise any other waveguiding material transparent at the predetermined wavelength.

In operation, light rays 29 that have traversed the input area are focussed firstly in the vertical plane by VCL 21, then in the horizontal plane (i.e. the substrate plane) by curved front surface 23. The focussed rays propagate through slab waveguide 22 and are collected by output waveguide 24. It will be appreciated that for VCL 21 to correctly focus light into slab waveguide 22, the two components must be accurately aligned in the vertical plane. To facilitate this alignment, receive element 20 and VCL 21 can be mounted on a common base 200. Alternatively, VCL 21 can be manufactured (say by injection moulding) with a pedestal that can serve as the common base, in which case VCL 21 and common base 200 form a unitary whole. Preferably, receive element 20 is mounted "upside down" on common base 200, with substrate 28 uppermost as shown in FIGS. 2a and 2b. One reason for this preference is that the crucial vertical alignment of VCL 21 and slab waveguide 22 is determined solely by the thickness of upper cladding layer 27, which is easier to control than the combined thickness of substrate 28 and lower cladding layer 25, which would need to be controlled if the alternative "right way up" assembly were used. In particular, the thickness accuracy of substrate 28 is limited by the substrate manufacturer's production process.

Thin films of polymer material suitable for lower cladding layer 25, patterned core layer 26 and upper cladding layer 27 can be deposited on substrate 28 by a variety of methods, including spin coating, dip coating, meniscus coating, extrusion coating, curtain coating, roller coating, spray coating, slot coating, screen printing and doctor blading. These thin films can then be photo-patterned as required with light either through a mask, e.g. in a mask aligner or stepper or by a laser direct writing procedure; exposure through a mask is generally preferred for high fabrication throughput.

While not essential, for several reasons it is preferred for substrate 28 to comprise a plastic material, rather than a more traditional optoelectronics substrate material such as silicon. Lower cost and reduced weight are two reasons for preferring plastic substrates; it may also be advantageous for the entire receive (and transmit) elements arrays to be flexible, for example to facilitate alignment with the various other components in the system. A further reason for employing plastic substrates is that during assembly of the optical components, it may be advantageous for the substrate to be transparent, e.g. so that a machine vision system can locate alignment marks. A large range of plastic substrates are available, including polyethylene terephthalate (PET), polyethylene naphthalate (PEN), polycarbonate (PC), polyvinyl chloride (PVC), polystyrene (PS), acrylates (such as PMMA) and polyimide (PI), all of which have been used in the flat panel display industry (W. A. McDonald, *Journal of Materials Chemistry* vol. 14, pp. 4-10, 2004). Of these, PET is by far the most widely used because it is inexpensive and widely available in large volume (for example as Melinex® or Mylar®), with high surface quality (i.e. smoothness, essential for waveguide fabrication). Polycarbonate is likewise inexpensive and widely available.

Figure 2A:
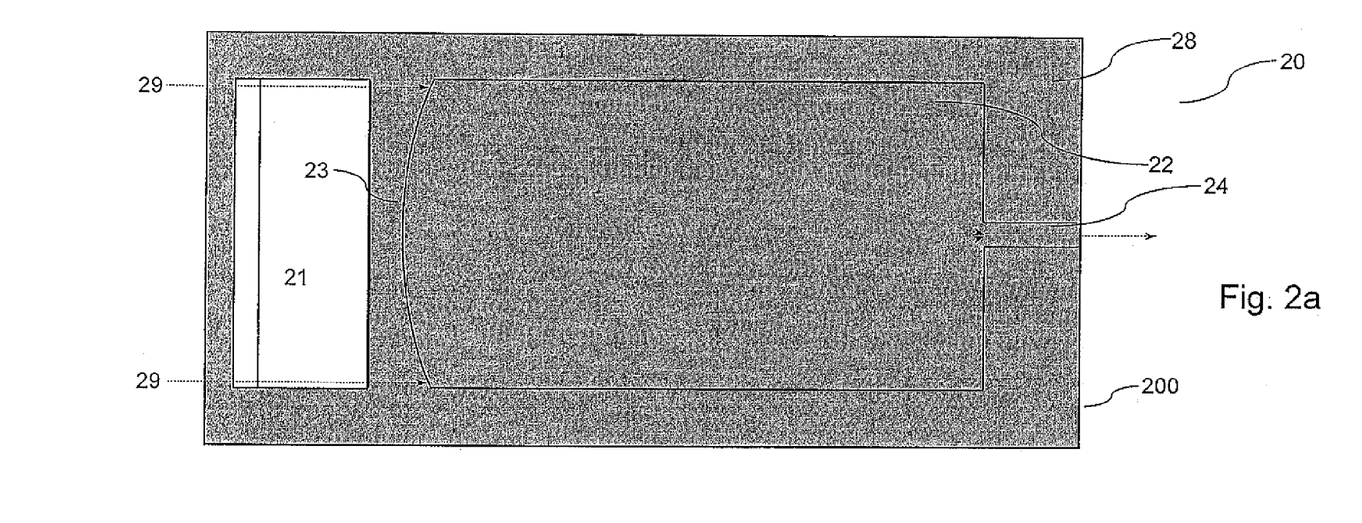
FIGS. 2a (plan view) and 2b (side view) show the construction of a receive element of an optical waveguide array, and its positioning with respect to an external vertical collimating lens.
Figure 2B:
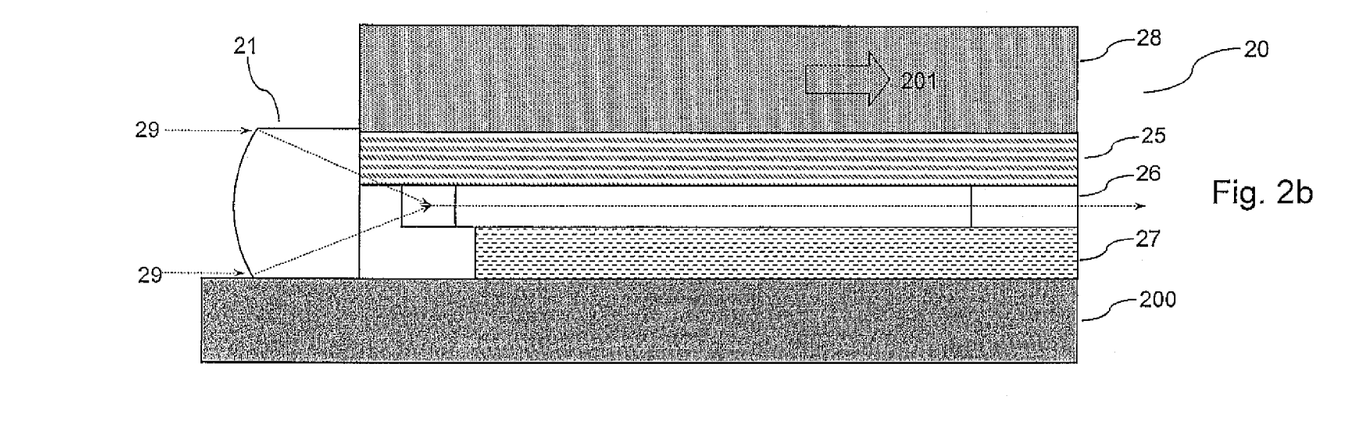

As will be understood by those skilled in the art, however, many plastics are transparent in the near infrared region below 1 μm, and inspection of FIGS. 2a and 2b shows that it is difficult to prevent a portion of light rays 29 from entering and being trapped within substrate 28, especially if substrate 28 is composed of a material with higher refractive index than lower cladding layer 25. For example, a fraction of the light between VCL 21 and receive element 20 passes through lower cladding layer 25, and may even pass through substrate 28 depending on the design details. This light may get trapped in the lower cladding and/or the substrate, an effect that may be exacerbated by any vertical misalignment between VCL 21 and receive element 20. Since substrate 28 is generally much thicker (of order 200 μm) than the lower cladding, core and upper cladding layers (of order 10 μm each), there is the potential for a significant proportion of the received light to be trapped and/or guided in substrate 28, instead of in core layer 26. This substrate-guided stray light is represented in FIG. 2b by arrow 201. It will be appreciated that since a single substrate may bear the entire array of receive waveguides that direct light to the multi-element detector e.g. see FIG. 3a for instance, light 201 guided in the substrate is a source of background intensity which reduces the signal-to-noise ratio of the signal received by the detector array. Note that it is in fact advantageous for substrate 28 to be composed of a material with higher refractive index than lower cladding 25, so that any stray light in lower cladding 25 is preferentially coupled into substrate 28, and then removed by one of the methods described below.

There are several other means by which stray light may become trapped within the substrate of conventional transmit or receive elements. For example, ambient light may be captured by the substrate on either the transmit or the receive side. Yet another source of stray light, specific to the transmit side, is optical source 11; since 1×N splitter 13 is generally fabricated on the same substrate as "transmit" optical waveguides 12, misalignment of optical source 11 with 1×N splitter 13 may result in a significant amount of optical power being launched into the substrate. Also, in some waveguide-based optical touch screen sensors, particularly those with large numbers of transmit and receive elements, there may be insufficient room within the screen bezel to accommodate all of the transmit and receive waveguides as they approach the optical source and detector. In such cases, it may be advantageous to use 1×2 splitters and 2×1 combiners to reduce the required numbers of transmit and receive waveguides respectively. Such splitters and combiners are well known in the art of integrated optical waveguides, and it is well known that while 1×2 splitters can be made essentially lossless, 2×1 combiners tend to incur a 3 dB loss. That is, only 50% of the light in the two input arms of a 2×1 combiner are coupled into the output arm, with the other 50% radiating into the cladding. If such 2×1 combiners are used, they will therefore be an additional significant source of stray light on the receive side.

Considering the various means by which stray light may become trapped and guided within the substrate or cladding of the transmit or receive side waveguide arrays of an optical touch screen sensor, and the difficulties this stray light can cause for the operation of the sensor, some method for reducing or preventing transmission of this stray light is particularly desirable.

In terms of wavelength, the stray light will comprise light of the predetermined wavelength (usually in the near infrared, from either signal light or ambient light), and may also comprise ambient light of other wavelengths, particularly in the visible. This specification describes methods for reducing transmission of stray light comprising both visible and near infrared wavelengths, as well as stray light comprising near infrared wavelengths alone. It should be noted that methods for removing "out of band" ambient light (i.e. ambient light of wavelengths other than the predetermined wavelength) are well known in the art of optical touch screen sensors, generally involving the placement of a visible light-blocking filter somewhere in the optical path. Commonly, the filter is combined with the bezel (U.S. Pat. No. 4,737,633). In waveguide-based optical touch screen sensors, the filter may for example be placed at the free space end of the receive waveguide array or between the receive waveguide array and the multi-element detector (U.S. Pat. No. 6,181,842). However since these prior art filters are all in the optical path, they cannot be used to remove stray light of the operating (i.e. the predetermined) wavelength. Hitherto there has not been any means known for removing stray light of the operating wavelength from waveguide-based optical touch screen sensors.

Figure 3A:
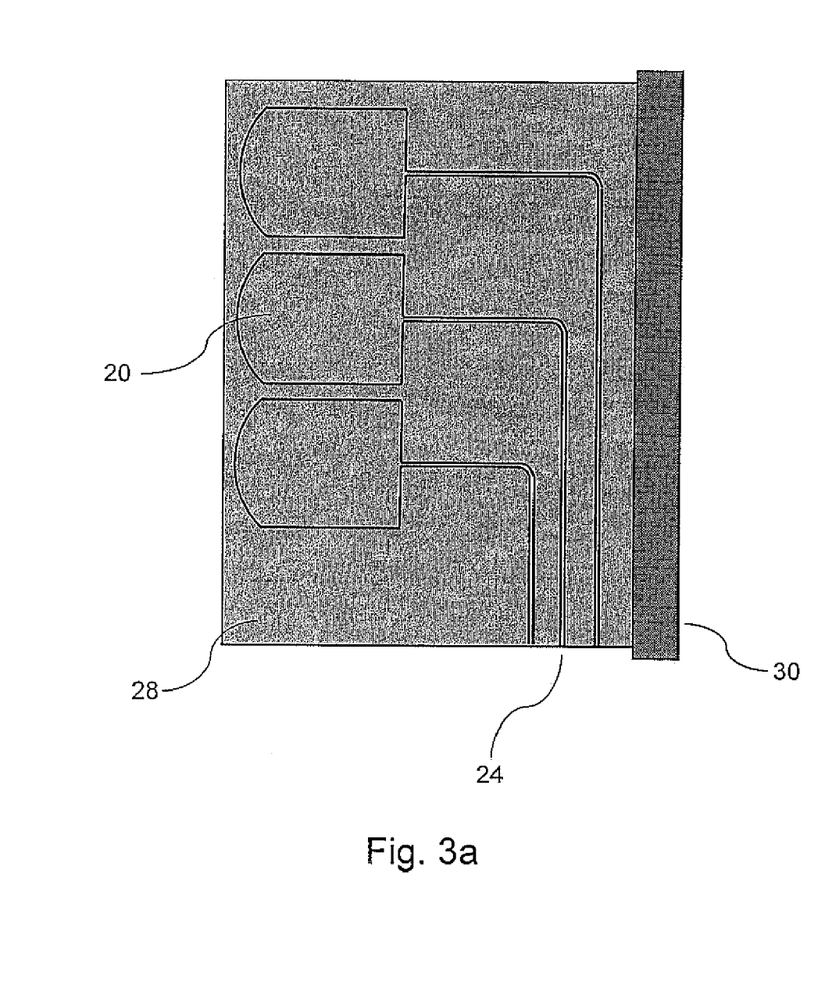
FIG. 3a (plan view) and 3b (side view) show a receive element according to a first embodiment of the present invention.
Figure 3B:
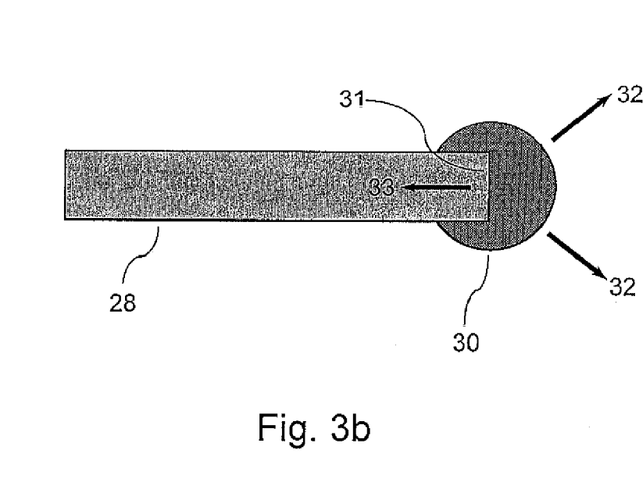

A first embodiment of the disclosure will now be described with reference to FIGS. 3a and 3b. In this embodiment the discontinuance to reduce stray light transmission is a coating or material applied to a portion of the waveguide substrate to strip stray light out of the substrate. As shown in FIG. 3a (plan view) and FIG. 3b (side view), a bead of material 30 (e.g. a glue line) may be placed along an edge 31 of substrate 28, after receive waveguides 24 have turned towards the multi-element detector. Preferably, bead 30 and substrate 28 have similar refractive indices, so that any stray light guided in substrate 28 is coupled to the material of bead 30 and then scattered (as represented by arrows 32) instead of being back-reflected off substrate edge 31 (as represented by arrow 33), where it can cause further background noise at the detector.

Preferably, bead 30 also contains a substance such as an organic dye that is highly absorbing at the operating wavelength. Bead 30 may also contain a substance with broadband absorption in the visible and near infrared regions of the spectrum, to remove ambient light captured by substrate 28. It may also contain a plurality of scattering centres, such as particles or voids, to scatter ambient light captured by substrate 28. Those skilled in the art will appreciate that such scattering centres will be most effective if their size is of a comparable order of magnitude to the wavelength of the ambient light. For convenience, bead 30 may comprise a polymer material, such as a heat-curable or UV-curable glue, that may be extruded along edge 31. For clarity, receive element 20 and receive waveguides 24 are not shown in FIG. 3b. An additional advantage of using bead 30 is that it can be arranged to contact lower cladding layer 25 and upper cladding layer 27 as well, and will therefore absorb stray light guided in these two layers.

Figure 4:
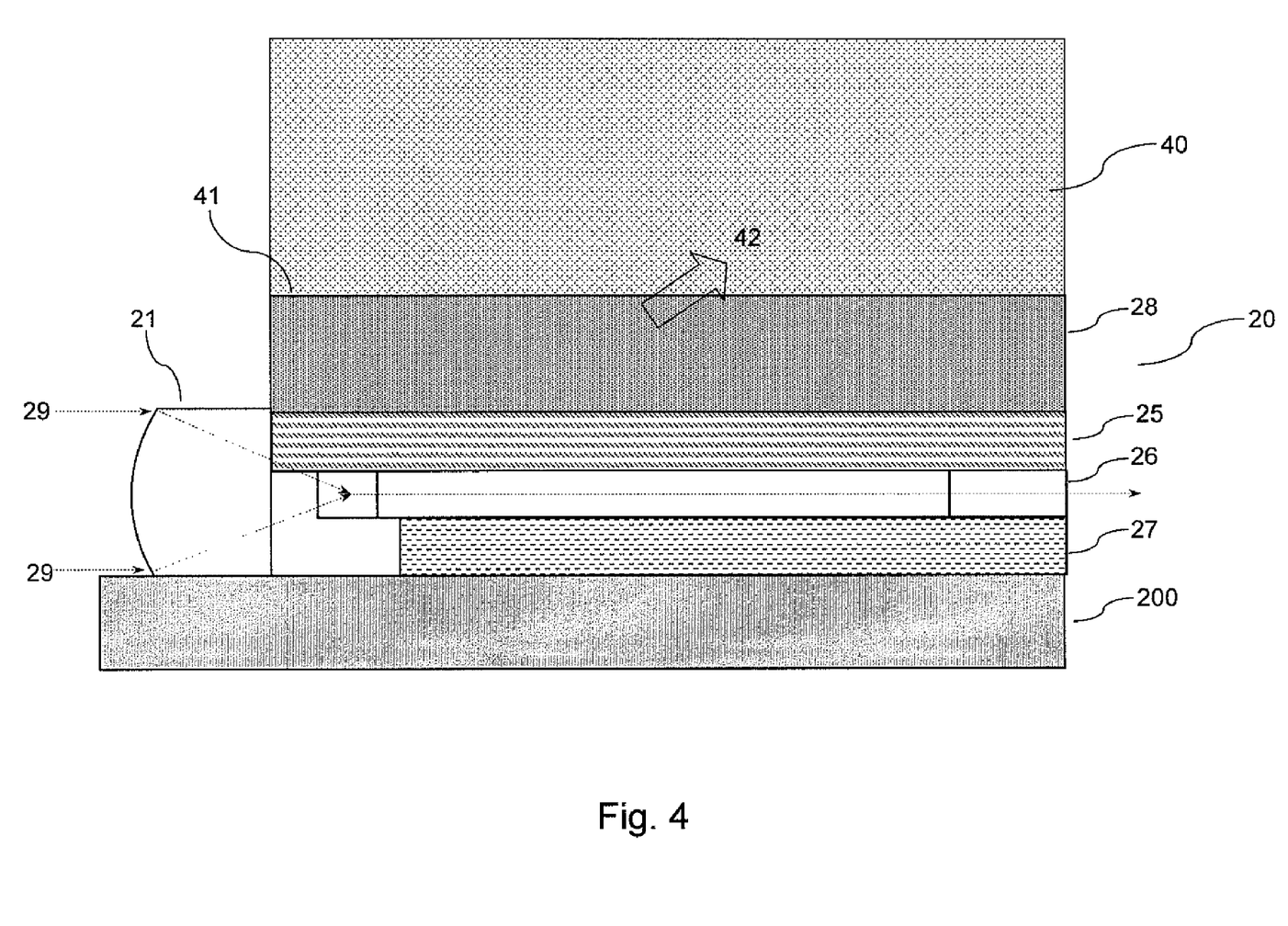
FIG. 4 illustrates a receive element according to a second embodiment of the present disclosure.

A second embodiment of the disclosure is illustrated in FIG. 4. In this example, the discontinuance comprises a coating 40 deposited on an exposed surface 41 of substrate 28. Note that in this case, advantage is taken of the preferred "upside down" assembly shown in FIGS. 2a and 2b. Preferably, coating 40 has higher refractive index than substrate 28, so that stray light 42 guided within substrate 28 is preferentially drawn into coating 40. Those skilled in the art will recognize that the refractive index of coating 40 will preferably be only slightly higher than the refractive index of substrate 28, to maximize the light stripping effect (M. J. F. Digonnet et al., Optics Letters vol. 10, pp. 463-465, 1985). Preferably, coating 40 also contains a substance such as an organic dye that is highly absorbing at the operating wavelength. For convenience, coating 40 may be a polymer material. Coating 40 may also contain a substance with broadband absorption in the visible and near infrared regions of the spectrum, to remove ambient light captured by substrate 28. It may also contain a plurality of scattering centres, such as particles or voids, to scatter ambient light captured by substrate 28. Importantly, there is no requirement for coating 40 to be deposited in any particular manner, and unlike the waveguide layers, it need not be a high quality, neatly deposited film. It may for example be a potting material used to encapsulate or protect the VCL/receive array assembly as a whole. Since such an encapsulating/potting material would quite likely be used to protect the assembly in any case, and would be applied only after the optical components have been assembled, this is a particularly preferred embodiment.

Figure 5:
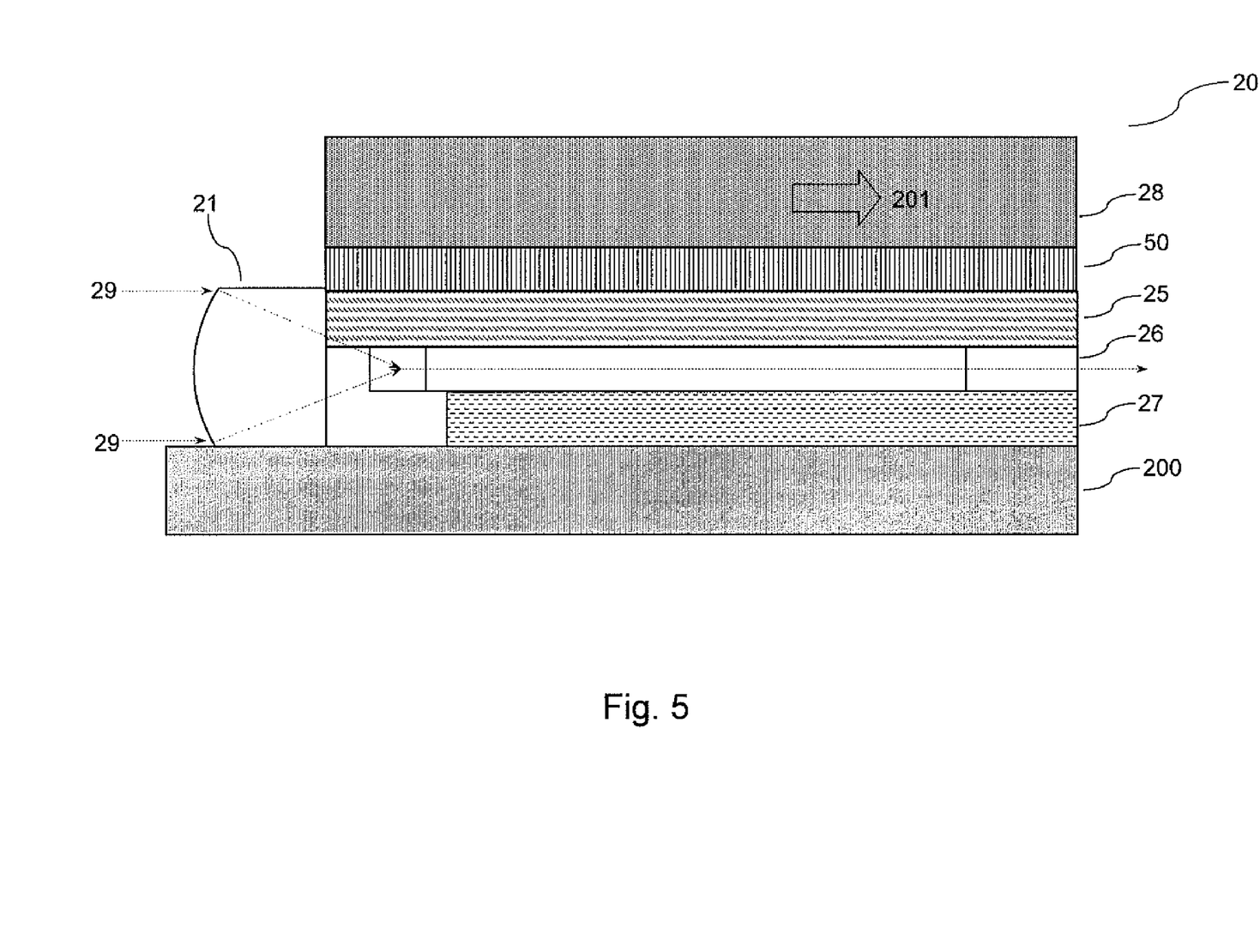
FIG. 5 illustrates a receive element according to a third embodiment of the present disclosure.

In a third embodiment of the disclosure, illustrated in FIG. 5, the discontinuance is provided by a layer of absorbing material 50 between substrate 28 and lower cladding layer 25. Preferably, absorbing layer 50 is composed of a polymer material similar to those used for lower cladding layer 25, patterned core layer 26, and upper cladding layer 27, and applied and cured in a similar manner to lower cladding layer 25. Absorbing layer 50 contains a substance, such as an organic dye, that is highly absorbing at the operating wavelength. It may also contain a substance with broadband absorption in the visible and near infrared regions of the spectrum, to remove ambient light captured by substrate 28 of lower cladding layer 25. It may also contain a plurality of scattering centres, such as particles or voids, to scatter ambient light captured by substrate 28 or lower cladding layer 25. Note that although it is also possible to dope lower cladding layer 25 or upper cladding layer 27 with a substance such as an organic dye that is highly absorbing at the operating wavelength, this is in general disadvantageous because the substance would also absorb the desired signal light propagating in patterned core layer 26. It will be appreciated by those skilled in the art of optical waveguides that a significant fraction of optical power propagating along the core of an optical waveguide extends into the cladding, so that the cladding material should be highly transparent at the operating wavelength. Likewise it would be generally disadvantageous for lower cladding layer 25 or upper cladding layer 27 to contain a plurality of scattering centres.

In still a further embodiment of the disclosure, the discontinuance is provided by the material from which the waveguide substrate is constructed. The substrate may be produced from a material that is highly absorbing at the predetermined wavelength, and preferably also in the visible, so that any stray light that is coupled into or leaks into the substrate is rapidly absorbed. The waveguide substrate may be composed of a material that is intrinsically absorbing at the predetermined wavelength; for example silicon is highly absorbing in the near infrared region at wavelengths shorter than 1 µm, and would absorb both stray signal light and ambient light. Alternatively, the waveguide substrate may comprise a material such as a polymer, doped with a substance such as an organic dye that is highly absorbing at the operating wavelength. The substrate may also contain a substance with broadband absorption in the visible and near infrared regions of the spectrum, to absorb ambient light. It may also contain a plurality of scattering centres, such as particles or voids, to scatter ambient light. This embodiment has the advantage of simplicity in that no additional coating is required to strip stray light out of the substrate, and is applicable irrespective of the orientation of the receive elements with respect to the common base.

As mentioned previously however, it is preferred to use substrates composed of polymer materials, and since these are usually transparent at the predetermined wavelength, they may need to be doped with an absorbing substance. Since the substrate material already has to satisfy several requirements, for example low cost and high surface quality, a polymer substrate material suitable for this embodiment may be difficult to obtain. In an additional material requirement, it has been found (U.S. patent application Ser. No. 11/355,668, incorporated herein by reference in its entirety) that when fabricating polymer waveguides on a polymer substrate via UV lithography, the substrate may need to contain a substance that absorbs the UV light. With this embodiment, particularly if the substrate has intrinsic broadband absorption or contains a broadband absorbing substance, an alternative to a machine vision system will be required as such a device will not be able to locate alignment marks through such a substrate.

Figure 6:
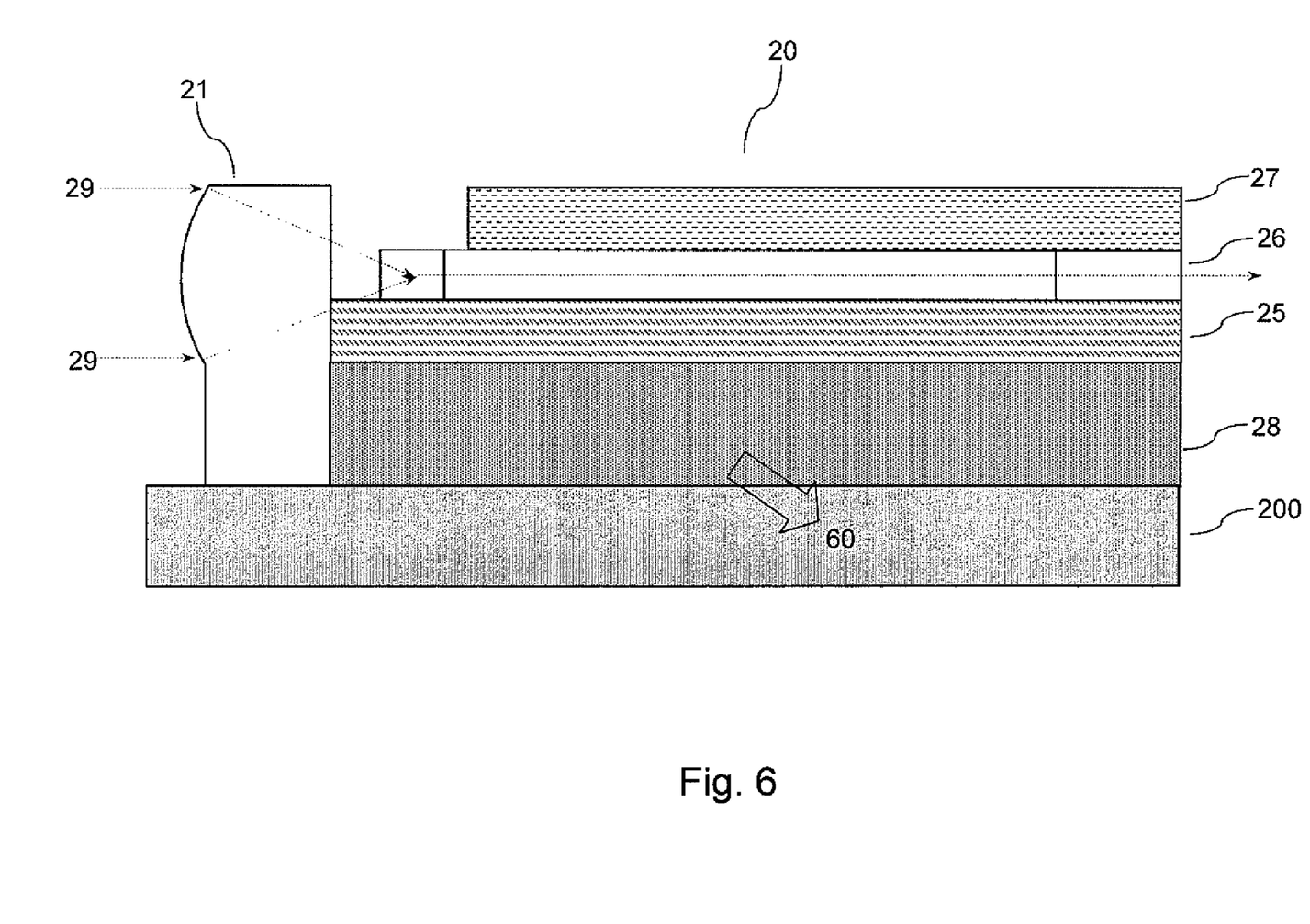
FIG. 6 illustrates a receive element according to a fourth embodiment of the present disclosure.

FIG. 6 shows a fourth embodiment of the disclosure, applicable to the "right way up" assembly. This embodiment uses a common base 200 for mounting and alignment of the element 20 and VCL 21. The common base 200 forms the discontinuance by being composed of a material with higher refractive index than substrate 28, so that stray light 60 guided within substrate 28 is preferentially drawn into common base 200. Preferably, common base 200 comprises a material that is highly absorbing at the operating wavelength, for example a polymer material doped with a substance such as an organic dye, that is highly absorbing at the operating wavelength. Common base 200 may also contain a substance with broadband absorption in the visible and near infrared regions of the spectrum, to absorb ambient light captured by substrate 28. It may also contain a plurality of scattering centres, such as particles or voids, to scatter ambient light. Alternatively, common base 200 may be coated with a material containing a substance such as an organic dye that is highly absorbing at the operating wavelength. This material may also contain a substance with broadband absorption in the visible and near infrared regions of the spectrum, to absorb ambient light, or a plurality of scattering centres, such as particles or voids, to scatter ambient light. This coating alternative is particularly useful for configurations where common base 200 and VCL 21 form a unitary whole, say a single piece of injection moulded plastic, since VCL 21 is in the optical path and must not be absorbing at the operating wavelength.

It can be seen that all of the above embodiments involve the use of a polymer material, be it a glue line or a potting compound applied to the substrate, the material of the substrate itself, or a common base or coating thereon containing a substance that is highly absorbing or scattering at least at the operating wavelength. As mentioned above, the operating wavelength is preferably in the near IR, for example 850 nm. A highly absorbing substance may for preference be a polymer-compatible organic dye, such as one of the near infrared dyes (eg SDA5688 or SDA8435) available from H.W. Sands Corp, however many other IR-absorbing materials (such as carbon black) that can be dissolved or dispersed in a polymer will be known to those skilled in the art. Materials such as carbon black with broadband absorption in the visible and near infrared regions of the spectrum may advantageously remove both stray signal light and ambient light. A highly scattering substance may for preference be a plurality of micro-bubbles or particles of a substance with a refractive index significantly different from the material comprising the substrate, common base or coating. Many of the near infrared dyes of H. W. Sands Corp have the additional advantage of low absorption in the near UV region around 365 nm typically used for curing UV-curable polymers, so would not be expected to interfere with the UV-curing of a glue line or potting compound. Furthermore, they should not be decomposed by the UV curing process. However if the chosen IR-absorbing material were UV absorbing or sensitive to UV light, then a heat-curable glue or potting compound could be used instead.

It should be noted that schemes involving the use of absorbing regions to remove stray light are well known in the art of integrated optical waveguides, see for example EP patent application 0883000A1 and U.S. Pat. No. 6,920,257, some of which are similar to the discontinuances of the present invention. However such schemes have not been applied to the particular application of waveguide-based optical touch screen sensors.

Figure 7A:
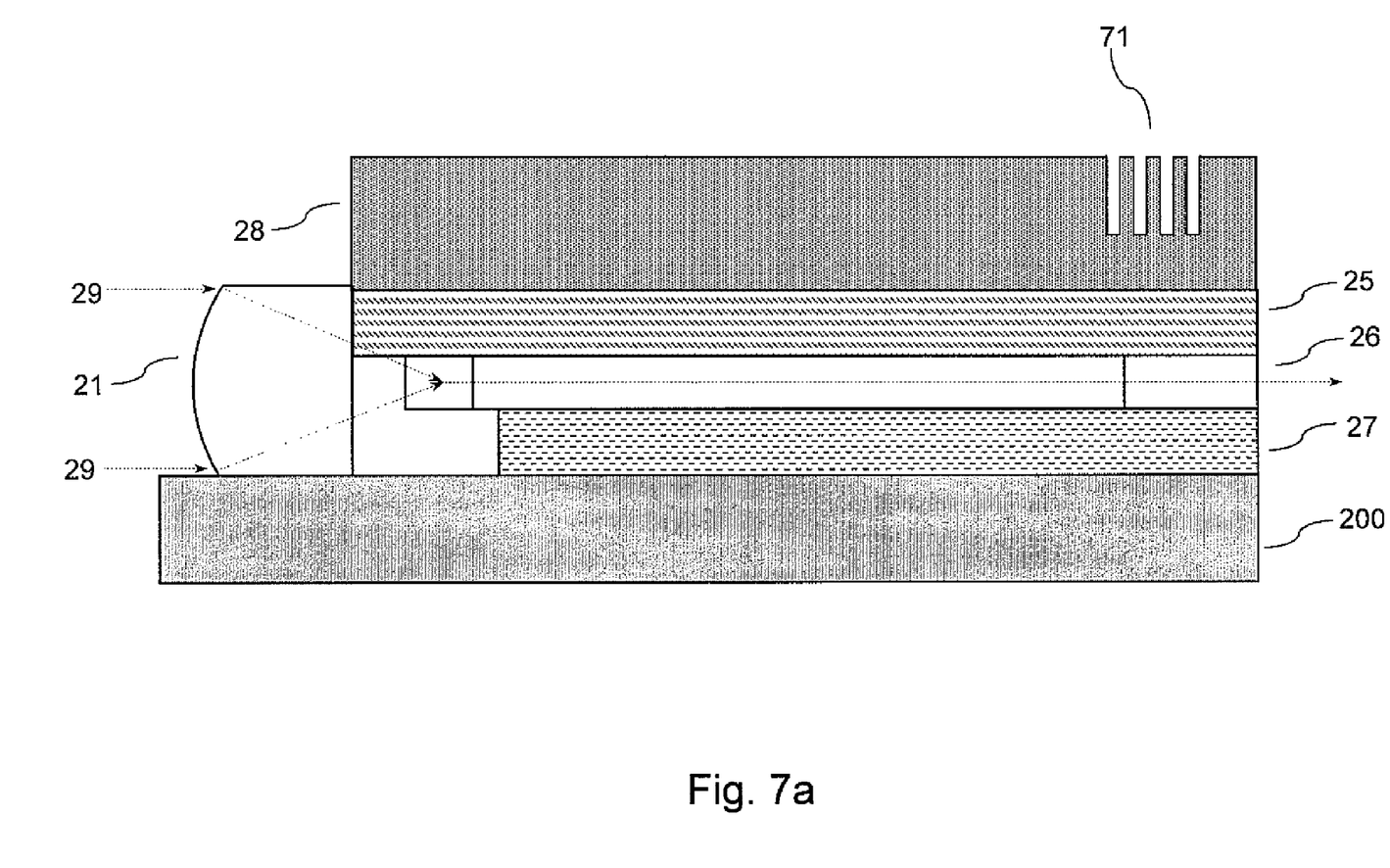
FIGS. 7a and 7b show a receive element according to a fifth embodiment of the present disclosure.
Figure 7B:
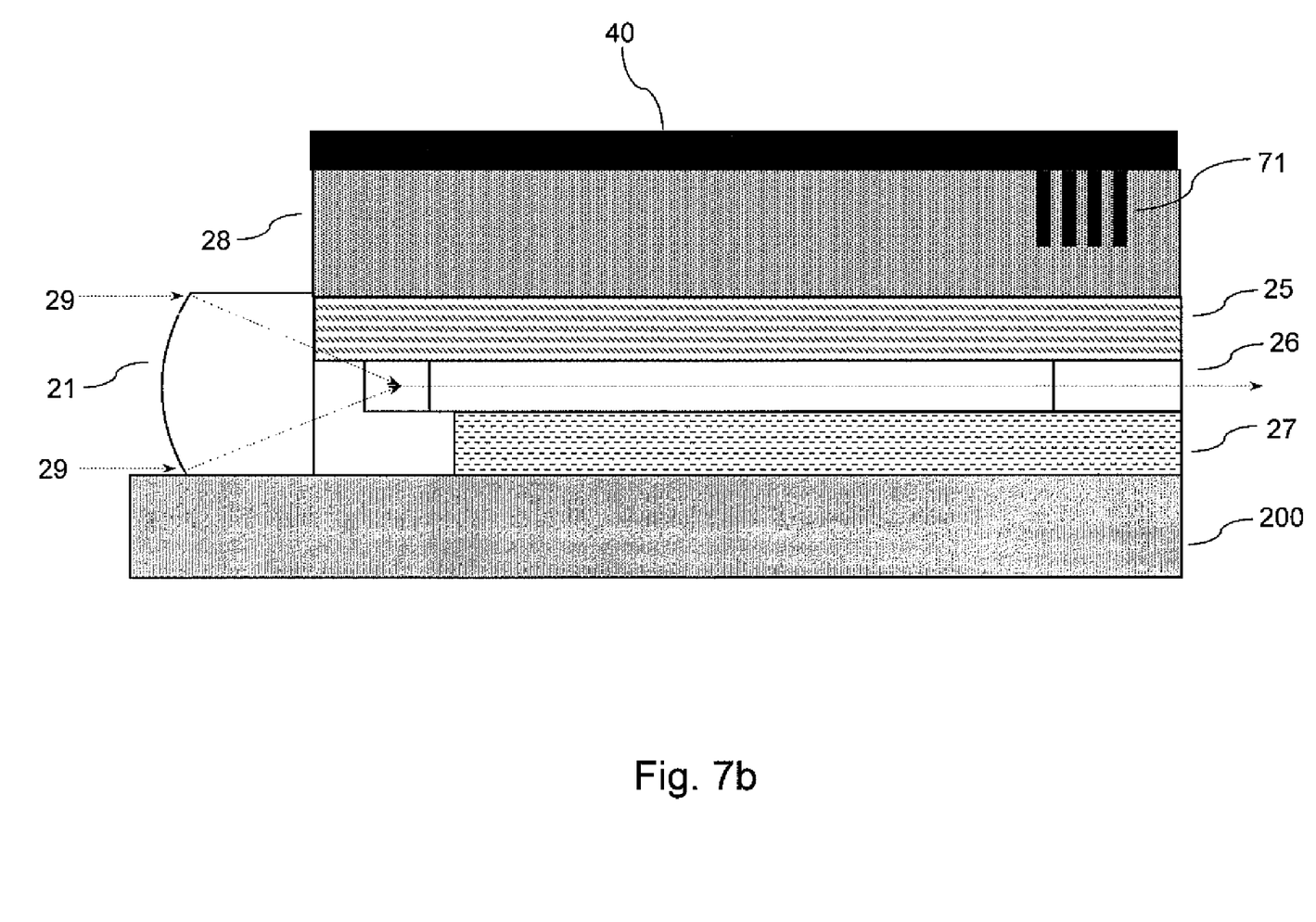

FIG. 7a shows a fifth embodiment of the disclosure, wherein a plurality of grooves 71 are cut or scratched, eg with a dicing saw, into the substrate 28. These grooves act to scatter stray light out of the substrate; they may be straight or curved, and may extend through the full substrate thickness, a small fraction of the substrate thickness or a combination of varying depths in between. Additionally, as shown in FIG. 7b, the substrate with grooves may be coated with an absorbing or scattering layer 40 as discussed previously with regard to FIG. 4. It will be appreciated that grooves could also be cut into common base 200.

Figure 8:
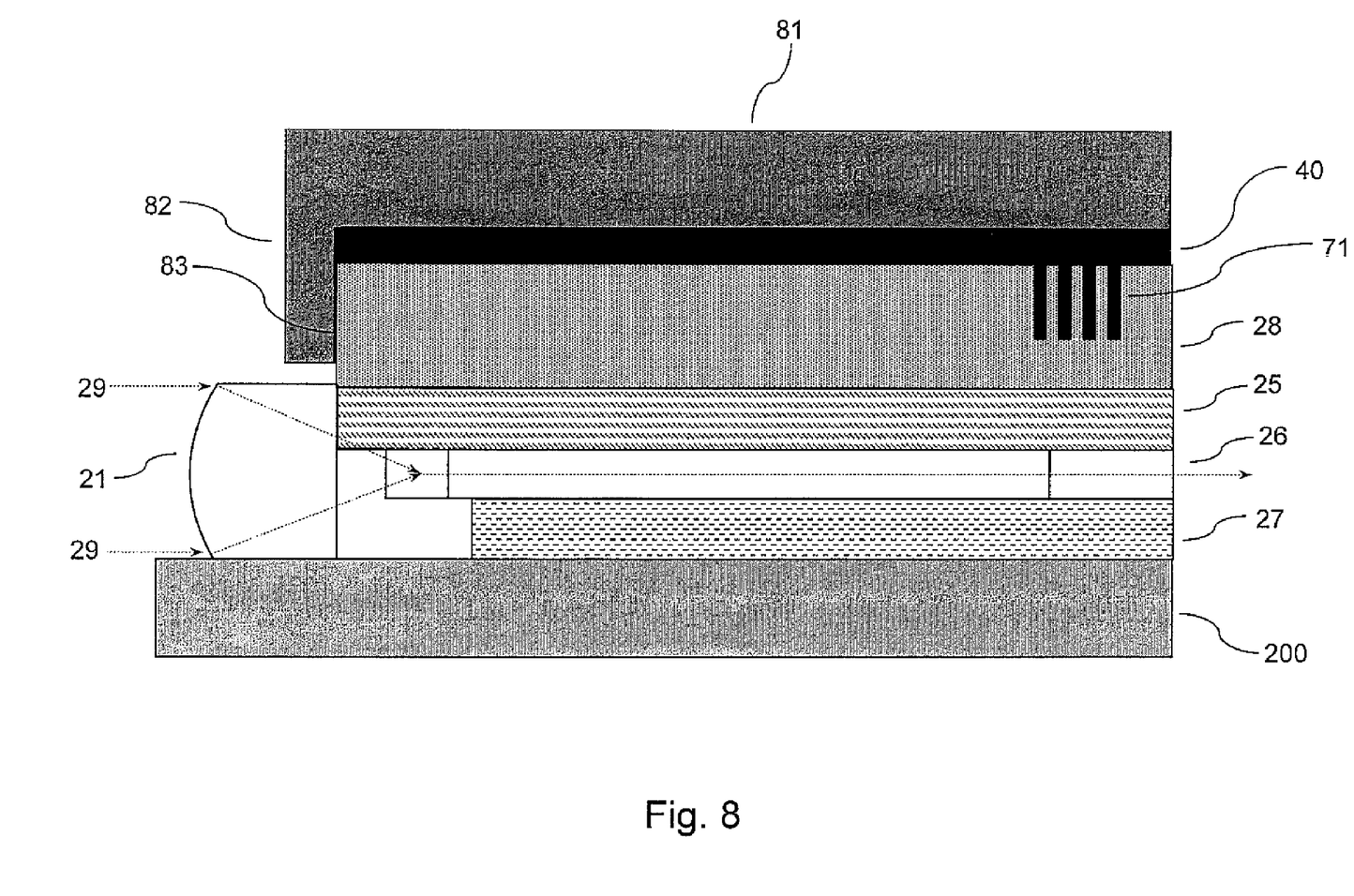
FIG. 8 shows a receive element according to a sixth embodiment of the present disclosure.

FIG. 8 shows a sixth embodiment of the disclosure, wherein substrate 28 (shown in this instance with light scattering grooves 71 and absorbing layer 40) is covered with a broad spectrum opaque material 81 (such as an aluminium plate) with a machined lip 82 or shield covering a substantial portion of end face 83 of substrate 28, thereby blocking ambient or signal light from directly entering the substrate. A similar shield means could be used to prevent ambient or signal light from entering common base 200.

If a significant amount of stray light remains in the substrate or common base, despite any or all of the efforts of the previous embodiments, that stray light may be prevented from reaching the multi-element detector by a similar shield means.

With reference to FIG. 4, the principles of the disclosure will now be exemplified with the fabrication and assembly of a receive element with two different light stripping potting compounds, according to a second embodiment of the disclosure.

EXAMPLE 1

Following the procedure disclosed in U.S. Pat. No. 6,818, 721, a lower refractive index polymer A was prepared with a viscosity of 2500 cP (at 20° C.) and a refractive index (measured at 20° C. on an Abbé refractometer with room light) of 1.483. A higher refractive index polymer B was prepared with a viscosity of 2200 cP (at 20° C.) and a refractive index of 1.509 (at 20° C.). A suitable photoinitiator was added to both polymer A and polymer B.

Polymer A was spin coated onto a substrate 28 composed of the polycarbonate Makrolon® UV (Bayer) with a co-extruded UV absorbing layer, and cured with UV light from a mercury lamp to form lower cladding layer 25 with thickness 20 μm and refractive index 1.485 (at 20° C. and 850 nm). Polymer B was spin coated onto lower cladding layer 25 and patterned with UV light through a mask; the unexposed polymer B material was then dissolved in isopropanol to form patterned core layer 26 comprising output waveguide 24 and slab waveguide 22 with curved face 23. Patterned core layer 26 had thickness 11 μm and a refractive index of 1.513 (at 20° C. and 850 nm). Finally, a protective upper cladding layer 27 was deposited by spin coating and UV patterning a second layer of polymer A. As disclosed in U.S. patent application Ser. No. 2005/0089298A1, incorporated herein by reference in its entirety, it is necessary to pattern upper cladding layer 27 in the same manner as for core layer 26, so that curved face 23 remains uncovered. Substrate 28, lower cladding layer 25, patterned core layer 26 and upper cladding layer 27 together comprise receive element 20.

Receive element 20 and VCL 21 were assembled together on common base 200 with an adhesive (not shown). Receive element 20 was mounted "upside down" as shown in FIG. 4, so that substrate 28 was uppermost. Preferably the adhesive is UV-curable, but a heat-curable adhesive may also be used. The materials comprising VCL 21 and common base 200 are not particularly important, but are for preference polymer materials. If a UV-curable adhesive is used, then common base 200 should be composed of a material transparent to the curing light.

In this example, the refractive index of the polycarbonate substrate material is ~1.56, i.e. higher than the refractive index of the lower cladding polymer (1.485), so that stray light will be guided preferentially in the substrate rather than in lower cladding layer 25. To prevent the stray light from degrading the signal-to-noise ratio, the uppermost surface of substrate 28 was coated with a light stripping layer 40 (as shown in FIG. 4) containing a substance highly absorbing at the predetermined wavelength, taken to be 850 nm. In this example, layer 40 comprised the UV-curable epoxy Norland 61 (refractive index ~1.55) doped with the dye SDA8700 (H.W. Sands Corp), extruded onto the uppermost surface of substrate 28. SDA8700 has an absorption maximum at 844 nm and a peak extinction coefficient of $3.0 \times 10^5$ l mol$^{-1}$ cm$^{-1}$, and will therefore be extremely effective at absorbing any stray 850 nm light.

EXAMPLE 2

Receive element 20 was fabricated and assembled with VCL 21 on common base 200, as in Example 1. To prevent stray light from degrading the signal-to-noise ratio, the uppermost surface of substrate 28 was coated by extruding the UV-curable epoxy Norland 61 doped with the dye SDA8700 and carbon black. In this example, the dye will specifically absorb light at and in the vicinity of the predetermined wavelength, while the carbon black will absorb ambient light in the visible and near infrared.

With reference to FIG. 5, the principles of the invention will now be exemplified with the fabrication and assembly of a receive element with an additional light absorbing layer, according to a third embodiment of the invention.

EXAMPLE 3

Polymers A and B were prepared as in Example 1. A light absorbing polymer C was prepared by doping polymer A with the dye SDAS8700 (H.W. Sands Corp). Polymer C was spin coated onto a substrate 28 composed of the polycarbonate Makrolon® UV (Bayer) with a co-extruded UV absorbing layer, and cured with UV light from a mercury lamp to form absorbing layer 50 with thickness 20 μm. Polymer A was then spin coated onto absorbing layer 50, and cured with UV light from a mercury lamp to form lower cladding layer 25 with thickness 20 μm and refractive index 1.485 (at 20° C. and 850 nm). Polymer B was spin coated onto lower cladding layer 25 and patterned with UV light through a mask; the unexposed polymer B material was then dissolved in isopropanol to form patterned core layer 26 comprising output waveguide 24 and slab waveguide 22 with curved face 23. Patterned core layer 26 had thickness 11 μm and a refractive index of 1.513 (at 20° C. and 850 nm). Finally, a protective upper cladding layer 27 was deposited by spin coating and UV patterning a second layer of polymer A. Substrate 28, absorbing layer 30, lower cladding layer 25, patterned core layer 26 and upper cladding layer 27 together comprise receive element 20.

Receive element 20 and VCL 21 were assembled together on common base 200 with an adhesive (not shown). Receive element 20 was mounted "upside down" as shown in FIG. 4, so that substrate 28 was uppermost. Preferably the adhesive is UV-curable, but a heat-curable adhesive may also be used. The materials comprising VCL 21 and common base 200 are not particularly important, but are for preference polymer materials. If a UV-curable adhesive is used, then common base 200 should be composed of a material transparent to the curing light. In this example, stray light of the predetermined wavelength is absorbed by absorbing layer 50, and therefore will not degrade the signal-to-noise ratio at the multi-element detector.

EXAMPLE 4

This example demonstrates the efficacy of light scattering grooves for reducing the amount of light transmitted along a piece of substrate material. Light at 850 nm was launched via an SMF28 optical fibre into a piece of polycarbonate substrate material (10 mm wide by 50 mm long by 170 μm thick), and a power meter used to monitor the power emanating from the substrate. The piece of polycarbonate was replaced with another piece, identical except for ten 100 μm deep grooves cut into one side of it with a dicing saw, and the received power was reduced by 12 dB. That substrate side was then coated and the grooves filled with broad spectrum absorbing paint, and the received power was reduced by a further 4 dB.

Accordingly it can be seen that by providing a discontinuance in the form of grooves cut into non-core portion either along or in combination with a suitable broad spectrum absorbing material e.g. paint, substantial reduction in transmission of stray light can be accomplished.

EXAMPLE 5

Polymers A and B were prepared as in Example 1. Polymer A was spin coated onto a substrate 28 composed of a carbon black-containing polycarbonate Lexan FR700 (GE Plastics), and cured with UV light from a mercury lamp to form lower cladding layer 25 with thickness 20 μm and refractive index 1.485 (at 20° C. and 850 nm). Polymer B was spin coated onto lower cladding layer 25 and patterned with UV light through a mask; the unexposed polymer B material was then dissolved in isopropanol to from patterned core layer 26 comprising output waveguide 24 and slab waveguide 22 with curved face 23. Patterned core layer 26 had thickness 11 μm and a refractive index of 1.513 (at 20° C. and 850 nm). Finally, a protective upper cladding layer 27 was deposited by spin coating and UV patterning a second layer of polymer A. Substrate 28, lower cladding layer 25, patterned core layer 26 and upper cladding layer 27 together comprise receive element 20.

Receive element 20 and VCL 21 were assembled together on common base 200 with an adhesive (not shown). Receive element 20 was mounted "upside down" as shown in FIG. 4, so that substrate 28 was uppermost. Preferably the adhesive is UV-curable, but a heat-curable adhesive may also be used. The materials comprising VCL 21 and common base 200 are not particularly important, but are for preference polymer materials. If a UV-curable adhesive is used, then common base 200 should be composed of a material transparent to the curing light.

In this example the Lexan substrate is highly absorbing at the predetermined wavelength as well in the visible. Any stray light is readily absorbed and prevented from reaching the detector array, thereby maximising the signal-to-noise-ratio.

Although the disclosure has been described with reference to certain specific examples, it will be appreciated by those skilled in the art that the invention may be embodied in many other forms. Furthermore, the disclosure has been described in terms of the receive elements of a waveguide-based optical touch screen sensor, however the inventive principles also apply to the transmit elements.

What is claimed is:

1. A data input apparatus having at least one transmit element, at least one receive element and a detection device in optical communication with said receive element and adapted to detect interruption of signal light extending from said transmit element to said receive element, said interruption being associated with an input to said apparatus wherein at least one of said transmit element and said receive element includes at least one waveguide, each waveguide having a light transmitting core portion for transmission of said signal light and a non-core portion, and a discontinuance added to said non-core portion and adapted to substantially reduce the amount of stray light within said non-core portion reaching said detection device, said discontinuance being free of contact with said core portion.

2. A data input apparatus as claimed in claim 1 wherein said transmit element is coupled to a source of said signal light.

3. A data input apparatus as claimed in claim 1 wherein said discontinuance is adapted to scatter said stray light.

4. A data input apparatus as claimed in claim 3 wherein said discontinuance includes a plurality of light scattering grooves in said non-core portion.

5. A data input apparatus as claimed in claim 4 wherein said discontinuance is formed in at least a substrate of said waveguide.

6. A data input apparatus as claimed in claim 3 wherein said discontinuance includes particles and/or voids embedded in said non-core portion.

7. A data input apparatus as claimed in claim 6 wherein said discontinuance is formed in at least a substrate of said waveguide.

8. A data input apparatus as claimed in claim 1 wherein said discontinuance is adapted to absorb said stray light.

9. A data input apparatus as claimed in claim 1 wherein said discontinuance is adapted to divert said stray light.

10. A data input apparatus as claimed in claim 1 wherein said discontinuance is adapted to block said stray light from entering or leaving said non-core portion.

11. A data input apparatus as claimed in claim 10 wherein said discontinuance includes an opaque shield applied to said non-core portion.

12. A data input apparatus as claimed in claim 1 wherein said discontinuance includes a coating applied to said non-core portion.

13. A data input apparatus as claimed in claim 12 wherein said coating has a refractive index slightly higher than that of said non-core portion.

14. A data input apparatus as claimed in claim 13 wherein said coating includes a substance highly absorbing at a wavelength of said signal light.

15. A data input apparatus as claimed in claim 12 wherein said coating includes a substance highly absorbing at a wavelength of said signal light.

16. A data input apparatus as claimed in claim 1 wherein said discontinuance includes a substance with broadband absorption in the UV, visible and infrared regions of the spectrum.

17. A data input apparatus as claimed in claim 1 wherein said discontinuance includes a polymer doped with a light absorbing dye.

18. A data input apparatus as claimed in claim 1 wherein said discontinuance includes a material deposited along an edge of said waveguide.

19. A data input apparatus as claimed in claim 1 wherein said non-core portion includes at least one of an upper cladding, a lower cladding and a substrate.

20. A data input apparatus as claimed in claim 19 wherein said discontinuance is provided between a substrate and a lower cladding of said waveguide.

21. A data input apparatus as claimed in claim 1 wherein said discontinuance includes a substrate on which respective transmit/receive elements are formed, said substrate including a material that is highly absorbing at least at a wavelength of said signal light.

22. A data input apparatus as claimed in claim 21 wherein said substrate includes material that has broadband absorption in the UV, visible and IR regions of the spectrum.

23. A data input apparatus as claimed in claim 22 wherein said substrate has a refractive index slightly higher than that of said transmit/receive elements.

24. A data input apparatus as claimed in claim 21 wherein said substrate has a refractive index slightly higher than that of said transmit/receive elements.

25. A data input apparatus as claimed in claim 1 wherein said discontinuance includes a common base on which respective transmit/receive elements are mounted, said common base including a material or being coated with material that is highly absorbing at least at a wavelength of said signal light.

26. A data input apparatus as claimed in claim 25 wherein said common base includes material that has broadband absorption in the UV, visible and IR regions of the spectrum.

27. A data input apparatus as claimed in claim 26 wherein said common base has a refractive index higher than that of said non-core portion.

28. A data input apparatus as claimed in claim 25 wherein said common base has a refractive index higher than that of said non-core portion.

29. A data input apparatus as claimed in claim 1 wherein a respective transmit or receive element includes a plurality of discontinuances.

30. A method for reducing the transmission of stray light in a data input apparatus, said data input apparatus including at least one transmit element, at least one receive element and a detection device in optical communication with said receive element and adapted to detect interruption of signal light extending from said transmit element to said receive element, said interruption being associated with an input to said apparatus, wherein at least one of said transmit element and said receive element includes at least one waveguide, each waveguide having a light transmitting core portion for transmission of said signal light and a non-core portion, and wherein said method includes adding to said non-core portion a discontinuance adapted to substantially reduce the amount of stray light within said non-core portion reaching said detection device, said discontinuance being free of contact with said core portion.

31. A method as claimed in claim 30 wherein said transmit element is coupled to a source of said signal light.

32. A method as claimed in claim 30 wherein said discontinuance is adapted to scatter said stray light.

33. A method as claimed in claim 32 wherein said discontinuance includes one or more light scattering grooves in said non-core portion.

34. A method as claimed in claim 33 wherein said discontinuance is formed in at least a substrate of said waveguide.

35. A method as claimed in claim 32 wherein said discontinuance includes particles and/or voids embedded in said non-core portion.

36. A method as claimed in claim 35 wherein said discontinuance is formed in at least a substrate of said waveguide.

37. A method as claimed in claim 30 wherein said discontinuance is adapted to absorb said stray light.

38. A method as claimed in claim 30 wherein said discontinuance is adapted to divert said stray light.

39. A method as claimed in claim 30 wherein said discontinuance is adapted to block said stray light from entering or leaving said non-core portion.

40. A method as claimed in claim 39 wherein said discontinuance is provided as an opaque shield applied to said non-core portion.

41. A method as claimed in claim 30 wherein said discontinuance includes a coating applied to said non-core portion.

42. A method as claimed in claim 41 wherein said coating has a refractive index slightly higher than that of said non-core portion.

43. A method as claimed in claim 42 wherein said coating includes a substance highly absorbing at a wavelength of said signal light.

44. A method as claimed in claim 41 wherein said coating includes a substance highly absorbing at a wavelength of said signal light.

45. A method as claimed in claim 30 wherein said discontinuance includes a substance with broadband absorption in the UV, visible and IR regions of the spectrum.

46. A method as claimed in claim 30 wherein said discontinuance includes a polymer doped with a light absorbing dye.

47. A method as claimed in claim 30 wherein said discontinuance is provided along an edge of said waveguide.

48. A method as claimed in claim 30 wherein said non-core portion includes at least one of an upper cladding, a lower cladding and a substrate.

49. A method as claimed in claim 48 wherein said discontinuance is provided between a substrate and a lower cladding of said waveguide.

50. A method as claimed in claim 30 wherein said discontinuance includes a substrate on which respective transmit/receive elements are formed, said substrate including a material that is highly absorbing at least at a wavelength of said signal light.

51. A method as claimed in claim 50 wherein said substrate includes material that has broadband absorption in the UV, visible and IR regions of the spectrum.

52. A method as claimed in claim 51 wherein said substrate has a refractive index slightly higher than that of said transmit/receive elements.

53. A method as claimed in claim 50 wherein said substrate has a refractive index slightly higher than that of said transmit/receive elements.

54. A method as claimed in claim 30 wherein said discontinuance is provided as a common base on which the respective transmit/receive elements are mounted, said common base including a material or being coated with material that is highly absorbing at least at a wavelength of said signal light.

55. A method as claimed in claim 54 wherein said common base includes material that has broadband absorption in the UV, visible and IR regions of the spectrum.

56. A method as claimed in claim 55 wherein said common base has a refractive index higher than that of said non-core portion.

57. A method as claimed in claim 54 wherein said common base has a refractive index higher than that of said non-core portion.

58. A method as claimed in claim 30 wherein a respective transmit or receive element includes a plurality of discontinuances.

\* \* \* \* \*